Patented Dec. 29, 1925.

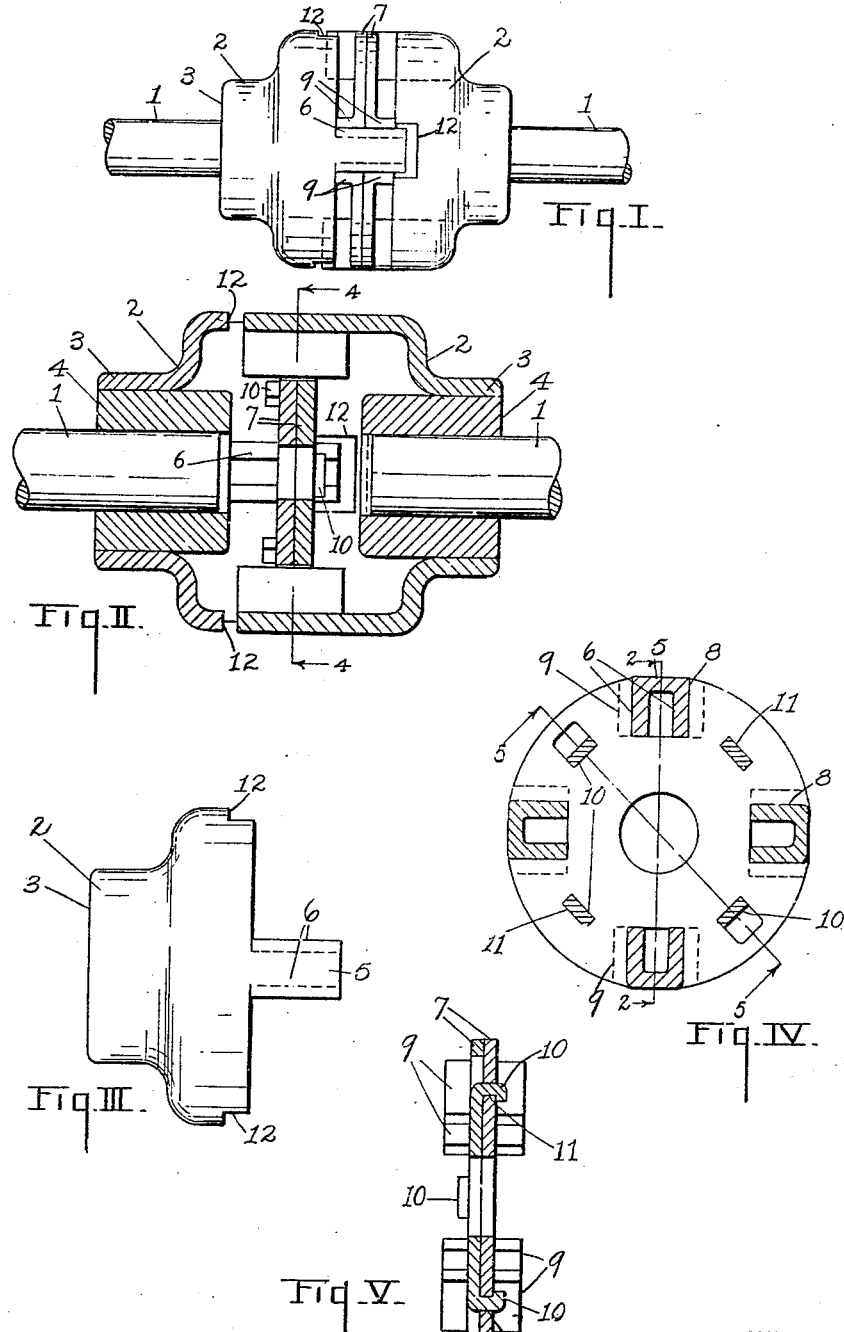

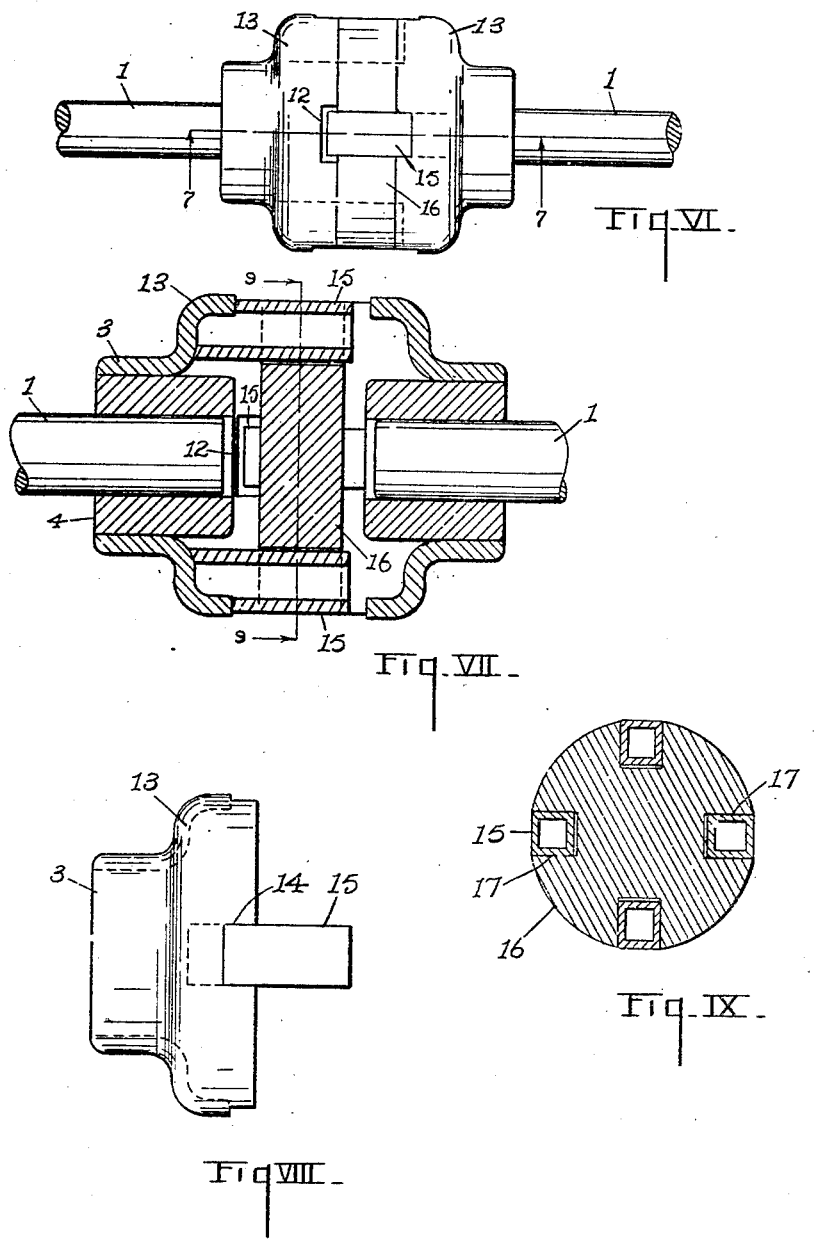

1,567,146

UNITED STATES PATENT OFFICE.

EUGENE HIGGINS, OF JACKSON, MICHIGAN.

SHAFT COUPLING.

Application filed May 24, 1924. Serial No. 715,541.

*To all whom it may concern:*

Be it known that I, EUGENE HIGGINS, a citizen of the United States, residing at the city and county of Jackson, State of Michigan, have invented certain new and useful Improvements in Shaft Couplings, of which the following is a specification.

This invention relates to improvements in shaft couplings.

The main object of this invention is to provide an improved shaft coupling or universal joint which is formed mainly of sheet metal stampings and at the same time is strong and durable and has substantial bearing or wear surfaces.

A further object is to provide an improved universal joint or shaft coupling which is very light in weight.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side view of my improved shaft coupling, the shaft sections joined being broken away.

Fig. II is a longitudinal section on a line corresponding to line 2—2 of Fig. IV.

Fig. III is a side view of one of the shaft members disassembled from the other parts.

Fig. IV is a transverse section through the coupling member on a line corresponding to line 4—4 of Fig. II.

Fig. V is a longitudinal section through the coupling member on a line corresponding to line 5—5 of Fig. IV.

Fig. VI is a side view of a modified form or embodiment of my invention.

Fig. VII is a longitudinal section on a line corresponding to line 7—7 of Fig. VI.

Fig. VIII is a side view of one of the shaft members disassembled from the other parts.

Fig. IX is a transverse section on a line corresponding to line 9—9 of Fig. VIII.

In the drawing the sectional views are taken looking in the direction of the little arrows at the ends of the section lines and similar numerals of reference refer to similar parts throughout the several views.

Referring to the drawing, 1, 1 represent the shaft sections to be coupled. I provide a pair of shaft members 2, these shaft members being duplicates. They are formed as stampings, being cupped or cup-shape and having integral shaft sockets 3 provided with bushings 4 to adapt them to the shaft sections 1.

The driving lugs 5 project from the edges of the shaft members and these lugs have inturned flanges 6 at their longitudinal edges providing bearing surfaces of substantial width.

The preferred form of coupling member shown in detail in Figs. IV and V comprises a pair of disks 7 having radial openings 8 therein adapted to receive the driving lugs 6, the edges of these openings having longitudinally disposed flanges 9, the flanges coacting to provide bearings of substantial width for the driving lugs. The coupling members 7 are secured together by the integral tongues 10 of one member engaged through slots 11 of the other and clamped thereon.

This forms a coupling member of very light weight and at the same time one which is strong and has bearing surfaces of substantial area for the driving lugs. The shaft members preferably have recesses 12 in their edges opposite the driving lugs so that the lugs may project entirely through the coupling member.

In the modification shown in Figs. VI to IX the shaft members 13 are the same as the shaft members 2 with the exception that they have slots 14 in their edges into which the driving lugs 15 are inserted and secured, the driving lugs being in the form of tubes of rectangular cross section. This provides the necessary strength and also the feature of lightness is maintained. In this embodiment the coupling member 16 is a one-piece member and is provided with radial slots or bearing openings 17 for the driving lugs.

My improved coupling is strong and durable in proportion to its weight. The parts are economical to manufacture and assemble.

Having thus described my invention what I claim as new and desire to secure by Letters Patent is:—

1. A shaft coupling comprising a pair of cup-shaped shaft members formed as stampings with driving lugs projecting from the edges thereof, said driving lugs having inturned flanges at their longitudinal edges, and a coupling member comprising a pair of sheet metal disks having radial openings with laterally disposed flanges at the edges thereof providing bearings for said driving lugs, said disks being disposed back to back and having tongues and slots, the tongues of one interlocking with the slots of the other.

2. A shaft coupling comprising a pair of cupped shaft members formed as stampings with driving lugs projecting from the edges thereof, said driving lugs having inturned flanges at their longitudinal edges, and a coupling member comprising a pair of sheet metal disks disposed back to back and having radial openings with laterally disposed flanges at the edges thereof providing bearings for said driving lugs.

3. A shaft coupling comprising a pair of shaft members each having driving lugs, and a coupling member comprising a pair of sheet metal disks having registering radial openings with laterally disposed alined flanges at the edges thereof providing bearings for said driving lugs, said disks being disposed back to back and having tongues and slots, the tongues of one interlocking with the slots of the other.

4. A shaft coupling comprising a pair of shaft members each having driving lugs, and a coupling member comprising a pair of sheet metal disks disposed back to back and having registering radial openings with laterally disposed alined flanges at the edges thereof providing bearings for said driving lugs.

5. A shaft coupling comprising a pair of cupped shaft members formed as stampings with integral tubular shaft sockets and driving lugs projecting from the edges thereof, said lugs having inturned flanges at their longitudinal edges, bushings secured in said shaft sockets, and cruciform coupling members coacting with said driving lugs.

6. A shaft coupling comprising a pair of cupped shaft members formed as stampings with integral tubular shaft sockets and driving lugs projecting from the edges thereof, said lugs having inturned flanges at their longitudinal edges, and cruciform coupling members coacting with said driving lugs.

In witness whereof I have hereunto set my hand.

EUGENE HIGGINS.